June 27, 1967  J. J. ARPS  3,327,527
FLUID TEMPERATURE LOGGING WHILE DRILLING
Filed May 25, 1964  2 Sheets-Sheet 1
Fig. 1
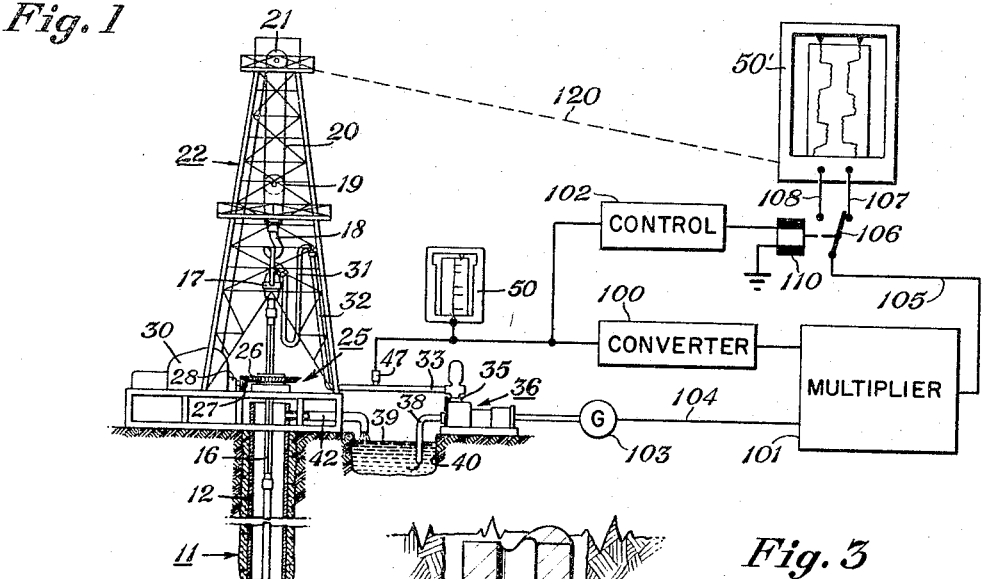
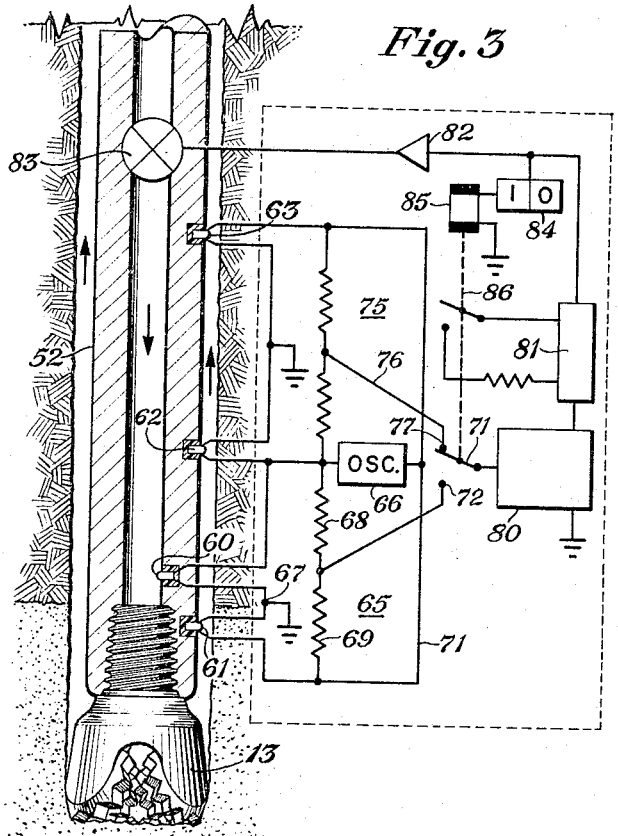
Fig. 3
Fig. 2
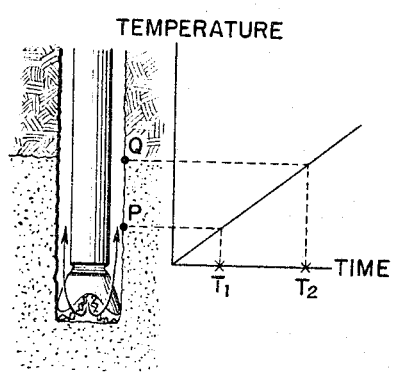
INVENTOR.
Jan J. Arps
BY D. Carl Richards
Attorney June 27, 1967  J. J. ARPS  3,327,527
FLUID TEMPERATURE LOGGING WHILE DRILLING
Filed May 25, 1964  2 Sheets-Sheet 2
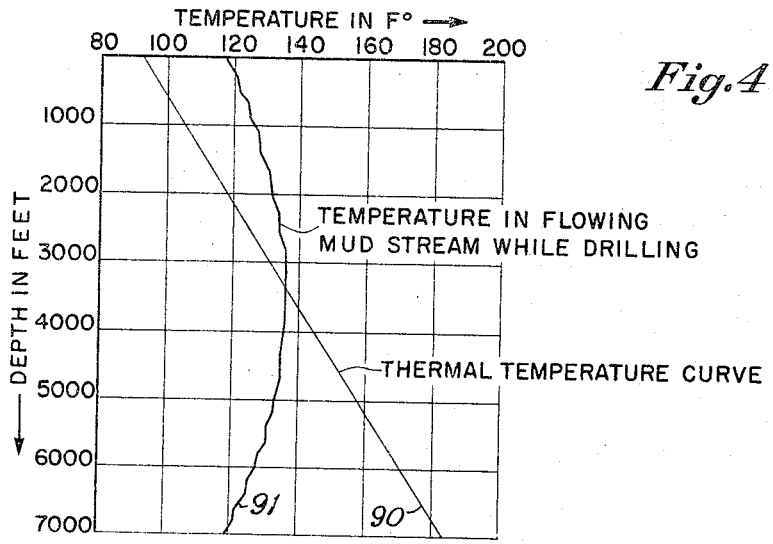
*Fig. 4*
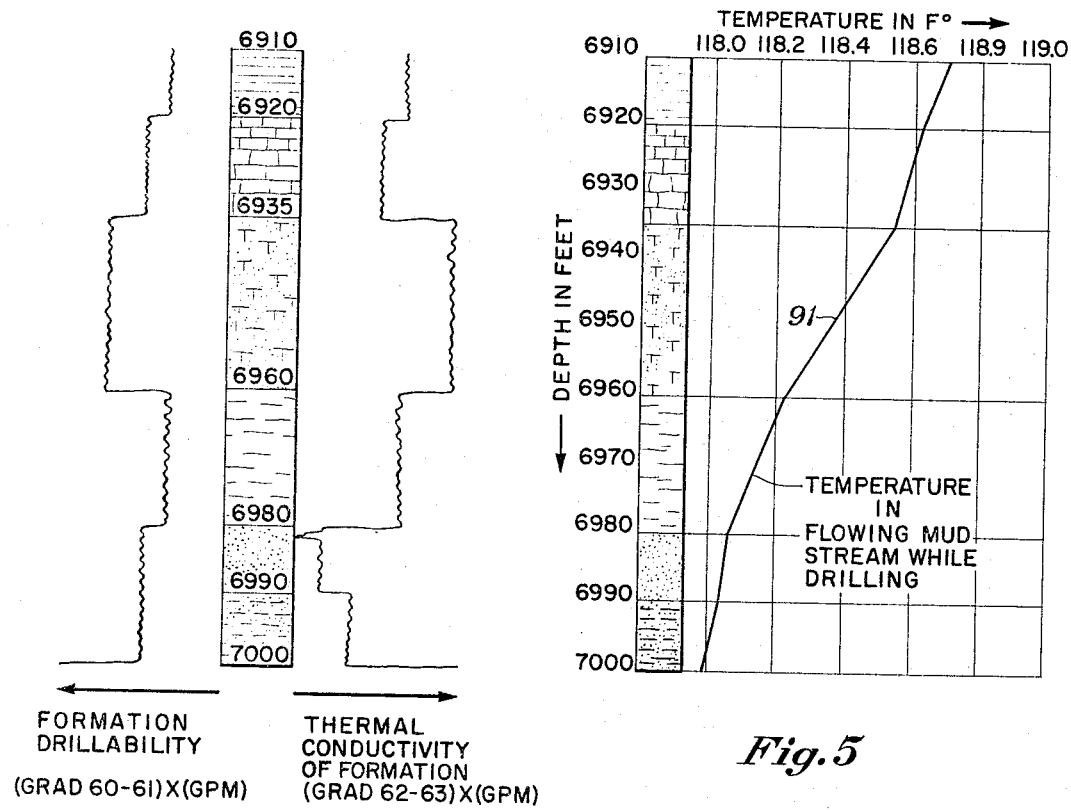
*Fig. 5*
*Fig 6*
INVENTOR.
Jan J. Arps
BY
Attorney United States Patent Office 3,327,527
Patented June 27, 1967

3,327,527
FLUID TEMPERATURE LOGGING WHILE
DRILLING
Jan J. Arps, Dallas, Tex., assignor to Arps Corporation,
Garland, Tex., a corporation of Delaware
Filed May 25, 1964, Ser. No. 369,890
15 Claims. (Cl. 73—154)

This invention relates to logging while drilling and more particularly to the measurement of the thermal gradients in the drilling fluid. In a more specific aspect, the invention relates to the measurement of the thermal gradient across the drill bit and over a pre-selected length of the mud stream downstream of the drill bit.

In a broad aspect, the invention relates to a method and system for deriving signals representing thermal conditions existing at the bottom of a bore hole as it is being drilled and to the transmission of such signals to the earth's surface. In a further aspect, the invention relates to the measurement of thermal conductivity of formations penetrated by a bore hole. Additionally the invention relates to the determination of a drillability function of the formations.

Applicant's prior Patent 2,524,031 relates to measurements of certain parameters of the formation near the bottom of the bore hole. Such measurements are converted into signals which may be telemetered to the surface while drilling. This provides the driller with certain types of information regarding the formations being penetrated by the drill.

Different methods or systems for making temperature surveys in bore holes also have been proposed or employed in the past. However, such methods have generally been confined to surveying the temperature conditions in mud-filled bore holes after the drilling equipment has been withdrawn from the bore hole or in producing or injection wells after casing has been cemented.

It is an object of the present invention to provide a novel and effective well logging apparatus for deriving signals representing the amount of heat dissipated by the drill bit as an indication of the character and drillability of the formation being penetrated and telemetering such information to the surface.

Another object of this invention is to utilize the heating effect of the bit as a warning system for a leak or impending "washout" in the drill pipe string, or as a warning system when one or more of the cones of a rock bit has become locked. In both cases, either the lack of circulation because of leakage, or the excessive heating due to sliding of the rock bit cones instead of rolling friction, will cause a sudden sharp increase in the heating effect of the bit which, when telemetered to the surface, can be made to serve as a warning to the driller to withdraw the drilling equipment from the hole for inspection before serious mechanical failure occurs.

A further object of this invention is to provide a novel well logging apparatus for deriving signals representing the vertical temperature gradient in the rising mud stream above the bit, which is a direct measure of the thermal conductivity of the freshly penetrated formations and indirectly reflects the porosity and fluid content of such formations, and telemetering such information to the surface while drilling.

Yet another object of the invention is to provide a novel and effective system to warn the driller when a high pressure gas bearing formation has been penetrated, which may cause a gas flow into the well bore and could result in a blowout of the well. In such cases the vertical temperature gradient of the rising mud stream above the bit will show an abrupt change due to the cooling effect of the expanding gas. Telemetering of this information to the surface will warn the driller of a possible impending blowout thus enabling him to take proper protective measures.

Still another object of the invention is to provide a novel and effective apparatus to warn the driller when a formation bearing hot salt water under high pressure has been penetrated. Influx of hot salt water into the well bore may cause an abrupt upward change in the vertical temperature gradient in the rising mud stream. Instantaneous telemetering of this information to the surface enables the driller to take proper precautionary measures.

In accordance with this invention, differential temperature measurements are made in the flowing mud stream between a first point located inside the drill collar representing the temperature of the ingoing mud and a second point on the outside of the drill collar just above the bit, representing the temperature of the mud after heat exchange at the drill bit. The temperature difference is also measured between a third point in the vicinity of the second point and a fourth point located above the third point. Both differential temperature measurements are translated into electrical signals and telemetered alternately to the surface while drilling.

For a more complete understanding of the present invention and for further objects and advantages thereof, reference may now be had to the following description taken in conjunction with the accompanying drawings in which:

FIGURE 1 is a diagrammatic representation of well logging apparatus constructed in accordance with one form of the invention;

FIGURE 2 illustrates the variation with time of the temperature at the boundary of an extended medium when subject to contact with a body of contrasting temperature;

FIGURE 3 is a more detailed representation of the downhole apparatus of FIGURE 1;

FIGURE 4 is a diagram representing the temperature conditions existing in the formation and in the upward flowing mud stream of a well which is being drilled;

FIGURE 5 is a more detailed portion of the variation of the temperature with depth existing in the upward flowing mud stream near the bottom of the bore hole; and FIGURE 6 is a dual temperature difference log as recorded at the surface, showing the temperature difference A–B on the left side and the temperature gradient B'–C on the right-hand side.

FIGURE 1 illustrates the general disposition of the apparatus employed in the invention. The lower uncased portion 10 of a bore hole being drilled has an upper portion 11 in which the usual surface string or conductor string of casing 12 has been set and cemented.

Within the bore hole and at the surface above the bore hole a substantial rotary drilling rig includes a drill string comprising a drill bit 13, a drill collar 14 and a drill stem composed of drill pipe 15 connected at its upper end through a kelly bar 16 to a swivel 17, which in turn is suspended from a traveling block hook 18, traveling block 19, drilling lines 20, and crown block 21 located in the top of a derrick 22. The kelly bar 16 passes through conventional gripping means in a rotary table 25 supported in the usual or suitable manner upon the derrick floor or foundations. The rotary table is adapted to be rotated by means of the usual bevel gear and pinion rotary table drive illustrated at 26 and 27, respectively. The pinion 27 is coupled to be driven in accordance with usual practice through a conventional chain drive or through a suitable shaft drive, as illustrated at 28, by the power unit of a drawworks 30.

The drilling fluid circulation passage extends from the drill bit 13, through the drill collar 14, and through drill stem 15, kelly bar 16, and swivel 17, is connected at the top through a suitable flexible connection or hose 31 and riser and connecting pipes 32 and 33, respectively, to the discharge connection 35 of a drilling fluid circulating pump 36. The drilling fluid circulating pump 36 takes suction through pipe 38 from a body of drilling fluid 39 contained in a mud reservoir or sump 40, as is conventional practice. The upper end of the surface casing 12, which provides a return path for circulating drilling fluid rising around the drill stem from the open bore hole therebelow, is provided with a lateral or side outlet pipe 42 which extends to an discharges into the drilling fluid reservoir 40.

A suitable pressure pickup device 47 is connected hydraulically to the fluid passage within the discharge pipe 33. The pressure pickup device 47 may be of any suitable type, but preferably one such as, for example, the Statham Laboratories Pressure Transducer, Model No. P10, adapted to convert fluid pressure communicated to it from pipe 33 into corresponding values of electric current or potential. This transducer is capable of producing an electric output signal which is a function of the instantaneous fluid pressure applied to it, which pressure in the present case is that appearing in pipe 33. The pressure pickup device 47 is connected to recorder 50 such as, for example, the Minneapolis-Honeywell Strip Chart Potentiometer manufactured by the Minneapolis-Honeywell Regulator Company. By this means the pressure variations or change in pressure throughout the drill stem, as it appears in pipe 33, may be continuously recorded on a chart 46 moving at a constant or suitable speed. As will hereinafter be shown a second recording preferably is made, utilizing the pressure signals generated down hole in response to drill fluid temperature.

More particularly the drill collar 14 comprises a substantially solid, tubular, lower section 52 of suitable length and weight and a tubular upper section 53 containing electrical and mechanical apparatus for mud column telemetering.

The upper end of the drill collar 14 is joined, by a suitable threaded connection or coupling 51, with the drill pipe 15, and the lower end of the drill collar is connected by coupling 61 to the drill bit 13.

In FIGURE 1, the drilling fluid is introduced into the well by way of the drill stem. The drilling fluid generally has a temperature which contrasts with the temperature of the formations. The earth of course is an extended medium. Its thermal characteristics may be measured by sensing the temperature characteristics of the drilling fluid.

Thermal conductivity can be measured by placing a cold object or fluid of the mud column in contact with the formations and measuring the rate of temperature increase with respect to time. Such a change is illustrated in FIGURE 2. The change in temperature of a given point within the earth following the instant of introduction of a cold mud column into the hole where it contacts the wall of the bore hole is illustrated.

Measurement of the thermal formation conductivity in wells has heretofore been accomplished by measuring the rate of increase of temperature at a given point in a stationary mud column with respect to time or by moving a heat source through the mud column and trailing the same by a temperature sensitive detector. In the latter case, an indication of the variation in thermal conductivity of the formation along which the heat source passes is provided. FIGURE 2 represents the change with time of temperature of the colder of the two bodies placed in contact with each other where the heat source is at a constant temperature.

When temperature is to be logged while drilling, the mud flowing through the drill stem is not stationary but must flow at a measurable rate. Time scale of a static system as illustrated by FIGURE 2 bears a fixed position to a depth scale in a dynamic system since the velocity of the drilling fluid may be measured. Assume, for instance, that at a time $T_2$, the mud sampde which was previously located at point P, at time $T_1$, is now at point Q. The measurements at times $T_1$ and $T_2$ in a stationary system can be replaced by measurements at points P and Q in a flow system. This transposition is useful in understanding the present invention and the measurement of thermal conductivity of the earth formations through which the drill hole passes.

Dynamic measurements are made in accordance with the present invention using the down hole system illustrated in FIGURE 3. The lower portion of the drill collar 52 includes a first pair of thermally responsive elements 60 and 61. Element 60 is mounted on the inner wall of the collar 52 and is insulated therefrom so that it is responsive to the temperature of the downwardly traveling drilling fluid. The element 61 is mounted on the outer wall of the collar 52 immediately above the bit 13.

A second pair of thermally responsive devices 62 and 63 are mounted on the outer surface of the drill collar 52 above the unit 61. Units 61-63 are thermally insulated from the drill stem so that they are responsive to variations in the temperature of the drilling fluid outside the drill stem.

In accordance with one aspect of the invention, the difference in temperature of the drilling fluid across the bit 13 is sensed for a first time interval. In a second aspect, the difference between the temperature of the drilling fluid at the locations of the elements 62 and 63 is sensed for a second time interval.

More particularly, the present invention employs the variations in drilling fluid temperature as measured at two locations in the bore hole while drilling in order to determine the drillability of the formations and in order to determine thermal conductivity of the formations.

As to formation drillability, the thermal energy released to the mud stream by the mechanical action of the drill bit will be expressed by the appearance of a difference between the temperature of the drilling fluid prior to the contact with the drill bit and the temperature of the drilling fluid immediately after it has contacted the bit. The two temperatures are measured, respectively, by means of the elements 60 and 61. In order to obtain a true reflection of the drillability parameter at the surface, the variations in the mud flow must be taken into consideration. Thus, in accordance with the present invention, a signal is generated representing the temperature difference between elements 60 and 61 and this signal is then multiplied by a signal proportional to the drilling fluid flow rate.

With respect to the measurement of thermal conductivity of the fomations, the heat transfer between the drilling fluid traveling through the annulus and the adjacent formations will be reflected in the temperature measurement between elements 62 and 63. In order to obtain a true reflection of the thermal conductivity parameter at the earth's surface independent of the mud flow variations, a signal proportional to the difference in temperature between the locations of elements 62 and 63 is multiplied by a signal proportional to the drilling fluid flow rate. The drillability parameter and the thermal conductivity parameter are then recorded on a second recorder 50' as functions of bore hole depth.

More particularly, measurements as above noted are carried out alternately. Elements 60 and 61 are connected in a first Wheatstone bridge network 65 and elements 62 and 63 are connected in a second Wheatstone bridge network 75. The two bridges are alternately connected to a bore hole telemetering system.

An oscillator 66 is connected across one diagonal of each of the networks 65 and 75. The elements 60 and 61 have a common terminal 67 connected to ground. The other terminal of element 60 is connected to the oscillator 66 and to one terminal of a resistor 68 which in turn is connected by way of a resistor 69 to the second terminal of the element 61. The juncture between resistor 68 and 69 is connected to terminal 70 associated with a switch 71. The juncture between resistance 69 and element 61 is connected by way of conductor 71 to the second terminal of the oscillator 66.

A similar circuit is provided for the bridge 75 with the conductor 76 leading to a second switch terminal 77.

The switch 71 applies the output signals from the bridges 65 and 75 alternately to a voltage-to-frequency converter 80. The output of the voltage-to-frequency converter 80 is a series of electrical pulses whose frequency is a known function of the voltage applied. The pulses are suitably shaped, as well known in the art, for counting purposes. The latter signals are then applied to a pulse dividing network 81 whose output is applied by way of a control unit 82 to a control valve 83 in the mud stream. The control system including unit 82 and valve 83 may be of the type disclosed in Arps Patents Nos. 2,524,031, 2,658,284, and 2,659,046, and in Alder Patent No. 2,898,088.

In one form of the invention, the line leading from unit 81 is connected to a unit 84 which includes a scale-of-two counter and a control circuit for a relay coil 85. The relay coil will serve to control the switch 71 such that it will connect unit 80 to bridge 65 during the interval required for a pair of pulses to be applied to unit 82. The relay coil 85 will then be de-energized so that the signal from bridge 75 will be applied to the converter 80 for a period during which two further pulses will be applied to the unit 82. The relay coil 85 also controls a second switch 78 which is in the control circuit of the pulse divider 81. Switch 78 serves to control production of pulses by divider 81 such that the pulses applied to unit 82 are of different lengths when the switch 78 is open, than when it is closed.

Signals from bridges 65 and 75 applied to the mud-control valves 83 are coded so that they can be distinguished at the earth's surface. The time interval between pulses representing the output of bridge 65 represents the temperature difference across the bit 13. Similarly the time interval between pulses representing the output of the bridge 75 represents the difference in temperature of the drilling fluid as it courses along the annulus between the locations of the sensing elements 62 and 63.

Preferably, the elements 60–63 are thermistors, solid semiconductor bodies with high temperature-coefficients of resistivity. Preferably, they will exhibit a linear voltage-current characteristic if the temperature is held constant. The mounting of the same is such that the thermistors will be responsive to the temperature of the drilling fluid. They permit measurement of thermal energy dissipated by the bit and by the mud fluid passing through the bit nozzles while drilling. This is a significantly different measurement than the measurement of the temperature of the bit itself. The temperature difference in the mud stream across the bit is an indication of the thermal energy dissipated in the region where work is performed by the bit. This is an indication of the drillability of the formations. Work is put into the system by the rotational force applied to the drill collar and bit and to the drilling mud as it courses through the drilling bit and impinges the formations and the bit components.

FIGURE 4 illustrates a typical representation of the temperature gradient in the earth. The temperature increases with depth in the earth as represented by the line 90. The curve 91 represents an example of the variation in mud temperature with depth in the earth in a dynamic system. In this example, the bit is assumed to be at the depth of 7,000 feet. At the depth of 7,000 feet, the static formation temperature is about 184° F. while the circulating mud after passing the drill bit at the bottom of the hole has a temperature of about 118° F.

The mud flowing upward passes through a heat exchanger with the earth formations around the bore hole wall acting both as heat source and a heat conducting material. The temperature of the mud rises while moving upward through the heat exchanger. As illustrated in FIGURE 4, the mud temperature is equal to the static formation temperature of 136° F. at a depth of 3,400 feet. From there to the surface, the mud is cooled by the formations causing the variation illustrated in the drawing. The mud reaches the surface at a temperature of about 117° F. It may also be noted that the temperature gradient in the annulus is a maximum near the bottom of the hole which is the only spot where truly virgin conditions are encountered. Because of the optimum conditions near the bottom of the bore hole, it is particularly advantageous to make measurements at that position. It will be noted that the curve 91 is not a smooth curve but reflects the effect of contact between the mud and formations of differing thermal conductivities.

FIGURE 5 illustrates in detail the lower portion of the curve of FIGURE 4. The bottom portion will be observed to vary fairly sharply in dependence upon the conductivity of the adjacent formation. For instance, in a hard, tight limestone section as from 6,935 feet to 6,960 feet, there is a substantially higher heat conductivity. Therefore, a substantially higher thermal gradient is noted over that section than in the shale section from 6,960 feet to 6,980 feet. The gradient in the sandy shale section from 6,990 feet to 7,000 feet due to its better conductivity is substantially higher than in the porous sand section from 6,980 feet to 6,990 feet.

An approximation of the correlation between thermal conductivity of the formations in the earth, as related to porosity, and other characteristics is given by the following expression which appears in a thesis by Yousri Asaad, University of California, 1955, entitled, "A Study of Thermal Conductivity of Fluid Bearing Porous Rock":

$$K = k_1 \left( \frac{k_2}{k_1} \right)^m \tag{1}$$

where $K$=thermal conductivity of fluid saturated rock
$k_1$=thermal conductivity of rock solid
$k_2$=thermal conductivity of saturating fluid
$m$=an empirical exponent=to $c \times \phi$
$\phi$=fractional porosity
$c$=a correlation factor $\cong$ to 1.0

A knowledge or estimate of the static formation temperature encountered by the drill bit, the size of the bore hole, and of the temperature and flow rate of the mud at the bottom of the bore hole, makes it possible to establish a quantitative relationship between the thermal gradient measured in the rising mud stream and the porosity and fluid content of the penetrated strata.

At the earth's surface, the pressure pulsations appearing in the mud column are sensed by the detector 47. As above indicated, the output signal from detector 47 is applied to the time base recorder 50. The output signal from detector 47 also is applied, in accordance with the present invention, to a converter 100 which converts the time spaced pressure pulse signals from detector 47 into a variable amplitude voltage. The latter voltage is then applied to a multiplier unit 101 to supply the multiplier 101 with a first input function. The second input function is derived from a generator 103 driven by the mud pump 36. By this means, there is generated on channel 104 a signal proportional to the mud flow rate which may be conveniently thought of in terms of the number of gallons per minute (g.p.m.) of drilling fluid flowing through the bore hole. Thus, the output signal on channel 105 leading from the multiplier 101 is proportional to the product of the down hole temperature dependent signal and the drilling fluid flow rate. The temperature dependent signal as above indicated alternately is representative of the output from bridge 65 and from bridge 75 and represents a drillability function and a thermal conductivity function, respectively.

The signal from multiplier 101 is applied by way of channel 105 to a switch 106 which serves alternately to apply the multiplier output signal to input channels 107 and 108 on recorder 50'. A pulse counting channel 102 connected to the output of the detector 47 is a companion to the down hole counter 84, FIGURE 3. The unit 102 controls energization of a relay coil 110 alternately to connect channel 105 to input lines 107 and 108. By this means, the two traces remaining on recorder 109 are correlated with the transmission to the earth's surface of signals representing the temperature difference across the drill bit as between elements 60 and 61, and the temperature difference between elements 62 and 63, respectively. Signal generation in detecting unit 47 and conversion of the pulse time information to an analog voltage in unit 100 may be carried out in accordance with the teachings of the above-identified prior patents of Arps and Alder.

The multiplier 101 may be of the type disclosed in the "Handbook of Automation Computation and Control" by Grabbe et al., John Wiley & Sons, Inc., 1959, volume 2, page 23-01 et seq. Other systems for carrying out the operation of multiplier 101 are illustrated in Patent 2,982,942 to J. E. White.

FIGURE 6 illustrates the data which is recorded on recorder 109 while drilling is in progress. The measurements are dependent upon the temperature difference across the bit as between detectors 60 and 61 and the temperature gradient as between locations of detectors 62 and 63 both multiplied by the drilling fluid flow rate signal.

The curves illustrated in FIGURE 6 are illustrative of the recording on recorder 50'. Included with signal traces 130 and 131 of FIGURE 6 is a representation of the geological sectional corresponding with the data plotted on the curves. The right-hand curve 130 represents the measurement of the fluid temperature by elements 60 and 61 multiplied by the drilling fluid flow rate (g.p.m.) with the product being plotted as a function of depth. This data is plotted to represent the thermal conductivity of the formation with increasing conductivity being scaled to the right.

Measurement of the temperature difference between elements 62 and 63 multiplied by g.p.m. is plotted as curve 131 on the left. This data is plotted as a formation drillability function with increasing drillability or ease of drilling being scaled to the left.

It should be noted that a relatively large amount of thermal energy is released to the mud stream merely by the throttling effect and the pressure drop in the mud stream across the bit nozzles. This energy, added to the mud stream in addition to that generated by the work of the bit on the formations, may tend to mask the measurements of the thermal energy released by the grinding action along. This ambiguity may be eliminated in the following manner. As the drill pipe connection is made to add a new joint to the drill stem at the earth's surface, the bit is elevated from the bottom of the bore hole after the new joint is added, the driller circulates the mud through the drill stem while lowering the drill bit slowly back to the bottom. During the time interval that the drill bit is being lowered to the bottom, and with the pumps running at normal speed, no mechanical energy is expended on the bit. At this time, the right-hand pen on the recorder 50' is set or nulled to a zero base line. When the bit reaches the bottom and the mechanical grinding action starts, any new value of the drillability function is recorded as a displacement from the base line. It is to be understood that the chart in the recorder 50 is driven in proportion to the depth of the drill bit in the bore hole, as is conventional and well-known in the art for carrying out logging operations of drilling parameters. A linkage of this type is disclosed in U.S. Patents No. 2,278,819 and No. 2,883,256 to Paul B. Nichols.

Such a linkage 120 extends to recorder 50 to cause the paper strip in the recorder 50' to move at the same rate as the drill penetrates the formations. Thus, both logs are plotted against the depth of the bore hole. The log on the right-hand side of FIGURE 6 may be offset slightly upward to account for the distance between the bit and the mid-point between elements 62 and 63.

As to the drillability function of curve 131, it will be noted that a greater amount of heat is dissipated while drilling through a sandstone section from 6,935 feet to 6,960 feet than while drilling a shale section from 6,960 feet to 6,980 feet.

It is to be noted that at a depth of 7,000 feet a sudden sharp increase in the differential temperature across the drill bit is encountered. This may indicate an impending washout of the drill pipe or it may indicate that a cone of the drill bit is locked.

On the curve 130 it will be noted that the thermal conductivity of the sandstone section from 6,935 feet to 6,960 feet, because of the lower porosity, is substantially higher than the thermal conductivity of the sandy section from 6,980 feet to 7,000 feet. At the same time, the latter sandy section shows a difference in conductivity between the top gas bearing portion from 6,980 feet to 6,990 feet and the bottom water bearing portion from 6,990 feet to 7,000 feet.

If, after encountering a gas bearing sand at 6,980 feet the weight of the mud column in the bore hole is insufficient to keep formation gas from entering the bore hole and possibly causing a blowout, the effect of the gas entrance would be observed as shown at a depth of 6,981 feet. As shoon as the detector 62 is located below the point of gas entrance the sharp dip 132 in the curve would appear. In the opposite manner, a sudden influx of hot salt water, as shown at a depth of 7,000 feet would cause the temperature gradient across elements 62 and 63 to show a sharp increase the moment that the lower element 62 is below the point of the entrance of the salt water.

Having described the invention in connection with certain specific embodiments thereof, it is to be understood that further modifications may now suggest themselves to those skilled in the art and it is intended to cover such modifications as fall within the scope of the appended claims.

What is claimed is:
1. The method of logging a bore hole while drilling which comprises:
(a) pumping a drilling fluid into the bore hole through a drill stem to the drill bit and back to the surface along the annulus between the drill stem and the walls of the bore hole to transfer heat to said fluid from the bit and from virgin formations as they are exposed by operation of the bit, and
(b) continuously measuring the gradient in the temperature of the fluid in the immediate vicinity of said bit.

2. The combination set forth in claim 1 in which the temperature gradient of said fluid is measured across the drill bit.

3. The method set forth in claim 1 in which the temperature gradient of said fluid is measured downstream and in the immediate vicinity of the drill bit.

4. The method of logging a bore hole while drilling which comprises:
(a) pumping a drilling fluid into said bore hole for travel to and from the drill bit by way of the drill stem and the annulus between the drill stem and the walls of the bore hole to transfer heat to said fluid from the bit and from virgin formations as they are exposed by operation of the bit,
(b) sensing the temperature of drilling fluid at two different points spaced apart along the fluid flow path and both located in the immediate vicinity of the drill bit, (c) generating a condition which varies in accordance with the difference between such temperatures at said two points, and (d) registering said condition as a function of an independent drilling parameter.

5. The method according to claim 4 wherein the locations of said points are alternately selected between first locations upstream and downstream of the drill bit and second locations downstream of the drill bit only.

6. The method according to claim 5 wherein transmission of the condition is synchronously keyed to the selection of the locations of the points.

7. In a system for logging a well as it is being drilled by a bit mounted at the end of a drill stem and through which a drilling fluid flows to remove cuttings produced by the bit, the combination which comprises:

(a) a pair of temperature sensitive elements mounted in the drill stem immediately adjacent to said bit and at points which are spaced apart along the flow path of the drilling fluid and are insulated from the drill stem for contact thereof by the drilling fluid, (b) circuit means connected to said elements to produce an output signal representative of the difference in temperature of the fluid sensed by said elements, and (c) means for registering said output signal as a function of an independent drilling parameter.

8. The combination set forth in claim 7 wherein a first temperature sensitive element is mounted inside the drill stem immediately above the drill bit to sense the temperature of drilling fluid prior to contact with the bit, and the second temperature element is mounted in the outer wall of said drill stem to sense the temperature of the drill fluid immediately after it has contacted the drill bit.

9. The combination set forth in claim 7 wherein the temperature sensitive elements are mounted in the outer walls of the drill stem at points spaced different distances above the drill bit for contact with the drill fluid immediately after passing through the drill bit.

10. The method of logging a bore hole while drilling which comprises:

(a) pumping a drilling fluid into the bore hole through a drill steam to the drill bit and back to the surface along the annulus between the drill stem and the walls of the bore hole, the temperature of said drilling fluid being lower than the temperature of the virgin formations surrounding the drill stem in the region of the drill bit, thus causing a heat flow in which the formations act as a heat source and a heat-conducting material, and (b) measuring the temperature of the flowing fluid in said annulus at two different depths in the immediate vicinity of said bit, (c) producing a signal representative of the difference in the temperatures to represent the thermal conductivity of said virgin formations in the region of said drill bit.

11. The method of logging a bore hole while drilling which comprises:

(a) pumping a drilling fluid into the bore hole through a drill stem to the drill bit and back to the surface along the annulus between the drill stem and the walls of the bore hole, the temperature of said drilling fluid being lower than the temperature of the virgin formations surrounding the drill stem in the region of the drill bit, thus causing a heat flow in which the formations act as a heat source and a heat-conducting material, (b) continuously measuring the temperature of said drilling fluid at two different points vertically spaced apart along the fluid flow path in the immediate vicinity of said drill bit, and (c) indicating a function dependent upon the difference between the temperatures as said two points, said function representing the conductivity of said virgin formations in the region of said drill bit.

12. The method of logging a bore hole while drilling which comprises:

(a) pumping a drilling fluid into the bore hole through a drill stem to the drill bit and back to the surface along the annulus between the drill stem and the walls of the bore hole, the temperature of said drilling fluid being lower than the temperature of the virgin formations surrounding the drill stem in the region of the drill bit, thus causing a heat flow in which the formations act as a heat source and a heat-conducting material, (b) continuously measuring the temperature of said drilling fluid at two different points spaced apart along the fluid flow path in the immediate vicinity of said drill bit, (c) providing a first signal representing a functional relationship between the temperatures at said two points, (d) providing a second signal representing the rate of flow of said drilling fluid, and (e) modifying said first signal by said second signal to render the resultant signal independent of variation in said rate of flow whereby said resultant signal represents the conductivity of said virgin formations in the region of said drill bit.

13. In a system for logging a well as it is being drilled by a bit mounted at the end of a drill stem and through which a drilling fluid flows to remove cuttings produced by the bit, the combination which comprises:

(a) a pair of temperature sensitive elements mounted in the drill stem immediately adjacent to said bit and at points which are spaced apart along the flow path of the drilling fluid and are insulated from the drill stem for contact thereof by the drilling fluid, and (b) circuit means connected to said elements to produce a signal representative of the difference between the outputs of said elements.

14. In a system for logging a well as it is being drilled by a bit mounted at the end of a drill stem and through which a drilling fluid flows to remove cuttings produced by the bit, the combination which comprises:

(a) a first temperature-sensitive element mounted inside the drill stem immediately above the drill bit to sense the temperature of drilling fluid prior to contact with the bit, (b) a second temperature-sensitive element mounted in the outer wall of said drill stem to sense the temperature of the drilling fluid immediately after it has contacted the drill bit, and (c) circuit means connected to said elements to produce an output signal representative of the difference in temperature of the fluid sensed by the temperature sensitive elements.

15. In a system for logging a well as it is being drilled by a bit mounted at the end of a drill stem and through which a drilling fluid flows to remove cuttings produced by the bit, the combination which comprises:

(a) a first temperature-sensitive element mounted inside the drill stem immediately above the drill bit to sense the temperature of drilling fluid prior to contact with the bit, (b) a second temperature-sensitive element mounted in the outer wall of said drill stem to sense the temperature of the drilling fluid immediately after it has contacted the drill bit, (c) circuit means connected to said elements to produce a first output signal representative of the difference in temperature of the fluid sensed by the temperature-sensitive elements, (d) a sensing device for producing a second output signal representing the rate of flow of said drilling fluid, and
(e) means for combining the outputs of said circuit means and said sensing device to render the output from said circuit means independent of variations in the rate of flow of said drilling fluid.

References Cited

UNITED STATES PATENTS

| 2,313,384 | 3/1943 | Lee | 73—152 |
| 2,627,392 | 2/1953 | Morris | 175—39 X |

RICHARD C. QUEISSER, *Primary Examiner.*

J. W. MYRACLE, *Assistant Examiner.*